United States Patent [19]
Pierce

[11] Patent Number: 5,799,564
[45] Date of Patent: Sep. 1, 1998

[54] SPRING BRAKE ACTUATOR HAVING TWO-PLY PRESSURE PLATE ASSEMBLY

[75] Inventor: William C. Pierce, Muskegoon, Mich.

[73] Assignee: Nai Anchorlok, Inc., Muskegon, Mich.

[21] Appl. No.: 623,426

[22] Filed: Mar. 28, 1996

[51] Int. Cl.⁶ ............................................. F01B 19/00
[52] U.S. Cl. ......................... 92/99; 92/63; 92/129
[58] Field of Search ....................... 92/63, 99, 100, 92/129

[56] References Cited

U.S. PATENT DOCUMENTS

| | | |
|---|---|---|
| 2,236,266 | 3/1941 | Hewitt . |
| 2,478,575 | 8/1949 | Fitch . |
| 2,573,119 | 10/1951 | Torres .................. 92/99 |
| 2,605,957 | 8/1952 | Houston ............... 92/99 |
| 2,936,785 | 5/1960 | Hastings .............. 92/99 |
| 3,200,717 | 8/1965 | Einsiedler ............ 92/99 |
| 3,432,011 | 3/1969 | Altherr . |
| 3,439,585 | 4/1969 | Herrera . |
| 3,842,716 | 10/1974 | Swander, Jr. . |
| 3,926,094 | 12/1975 | Kurichh et al. ....... 92/63 |
| 4,403,538 | 9/1983 | Rise ..................... 92/100 |
| 4,469,015 | 9/1984 | Clark . |
| 5,105,727 | 4/1992 | Bowyer . |
| 5,517,743 | 5/1996 | Liebig ................... 29/521 |

FOREIGN PATENT DOCUMENTS

| | | |
|---|---|---|
| 393041 | 1/1933 | Belgium . |
| 2 374 561 | 12/1977 | France . |
| 33 44 622 | 6/1985 | Germany . |
| 37 27 355 | 3/1989 | Germany . |

OTHER PUBLICATIONS

International Search Report.

*Primary Examiner*—Thomas E. Denion
*Attorney, Agent, or Firm*—Rader, Fishman, Grauer & McGarry

[57] ABSTRACT

A two-ply pressure plate (36) for use in an air brake system (10) for a vehicle, such as a bus, truck or the like, is shown. The two-ply pressure plate (36) includes a diaphragm plate (92) which abuts a diaphragm (32) of an air brake system (10) and a support plate (98) which abuts the rear surface of the diaphragm plate (92). A control rod (18) is welded to the support plate (98) and diaphragm plate (92). Some form of mechanical or metallurgical interconnection between the support plate (98) and diaphragm plate (92) is formed in between the mounting point of the rod (18) and the outer perimeter of the smaller of the two plates.

20 Claims, 2 Drawing Sheets

SPRING BRAKE ACTUATOR HAVING TWO-PLY PRESSURE PLATE ASSEMBLY

BACKGROUND OF THE INVENTION

1. Field of the Invention

This invention relates to a spring brake actuator and, more particularly, to a spring brake actuator having a two-ply pressure plate assembly.

2. Description of the Related Art

An air brake system for a vehicle such as a bus, truck or the like, typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator.

When full air pressure is applied to the spring brake actuator, air pressure acting against a diaphragm and a pressure plate compresses the spring. A spring brake actuator rod is either integral with the pressure plate and held in a retracted position by the air pressure or retracted by a return spring. Depressing the brake pedal during normal driving operation introduces compressed air into the service brake actuator which, acting against a diaphragm, causes a service brake pressure plate and attached push rod to be extended and the brakes to be applied with an application force proportional to the air pressure in the service brake actuator. In the event of a loss of air pressure or an intentional exhaustion of air from the spring brake actuator, the brake will be mechanically activated by the force of a strong compression spring acting on the spring brake actuator rod which, in turn, acts upon the service brake push rod to apply the brakes. Examples of known dual chamber spring brake assemblies include U.S. Pat. No. 5,105,727 to Bowyer, issued Apr. 21, 1992, U.S. Pat. No. 3,439,585 to Herrera, issued Apr. 22, 1969; and U.S. Pat. No. 3,842,716 to Swander, Jr., issued Oct. 22, 1974.

A typical service brake pressure plate assembly comprises a circular, flat plate having the actuator rod welded to the center of one surface of the plate. The rod is welded to the plate by a conventional weld bead which extends around the perimeter of the base of the rod. FIG. 6 depicts an example of a known pressure plate assembly. This assembly 200 comprises a circular pressure plate 202 and an actuator rod 204 welded to one surface of the pressure plate 202 by a circular weld bead 206. The actuator rod 204 is welded to the pressure plate 202 such that the longitudinal axis of the rod 204 is aligned with the central axis of the circular pressure plate 202. Structurally, the largest loads experienced by the circular pressure plate 202 are experienced adjacent the mounting point of the actuator rod 204. Less structural strength is required near the perimeter of the circular pressure plate 202. Current pressure plates are formed of ¼-inch-thick steel and satisfactorily meet the structural requirements near the center of the plate. However, such plates far exceed the loads encountered adjacent the perimeter of each plate during normal operation. Consequently, the thickness of the plate at the perimeter constitutes excess weight.

It is desirable to reduce the weight of the pressure plate while at the same time maintaining the structural integrity of the plate under higher stresses at the center thereof.

SUMMARY OF THE INVENTION

The spring brake actuator according to the invention overcomes the problems of the prior art by incorporating a 2-ply pressure plate which resist the shear forces and creates an integral bond between the actuator rod and pressure plate.

A brake actuating mechanism according to the invention comprises a housing having first and second end walls defining a housing interior with an opening centrally disposed in the second end wall. An elastomeric diaphragm is suspended within the housing and divides the housing into a first chamber and a second chamber. A pressure plate assembly is received in the second chamber. The plate assembly comprises a push rod extending out of the housing through a centrally disposed opening and adapted to connect to a brake. The pressure plate assembly is reciprocally movable, responsive, in part, to the introduction and exhaust of pressurized fluid to the first chamber. According to one embodiment of the invention, the pressure plate assembly comprises a first plate and a second plate. The second plate abuts the first plate in face-to-face relationship with adjoining central portions. The push rod extends normally from the first and second plates. The push rod has an end welded to the first and second plates.

In another embodiment of the invention, the push rod is mounted to one of the central portion of the first plate and the first and second plates are secured to each other by at least one interconnection located intermediate the central portions and the peripheral edges thereof to resist shear forces acting between the first and second plates.

Preferably, the interconnection intermediate the central portions of the two plates comprises at least one embossment formed in the first and second plates to mechanically connect the two plates together. Alternatively, the intermediate interconnection of the first and second plates is at least one spot weld.

The invention relates to a method of making a pressure plate assembly for a brake actuator comprising the steps of placing a conductive metallic central portion of a first plate member in face to face relationship with a conductive metallic central portion of a second plate member. Flux material is deposited in a recess in a conductive metallic proximal end of a push rod. The proximal end of the push rod is positioned on the central portion of the second plate and surrounded with an insulating collar. The first and second plates and the push rod are placed in compression and a large pulse of electric current is applied to the first and second plates and the push rod to create a fusion zone between the central portions of the plates and the push rod to weld the same together.

BRIEF DESCRIPTION OF THE DRAWINGS

The invention will now be described with reference to the drawings in which.

DETAILED DESCRIPTION OF THE PREFERRED EMBODIMENTS

Figure 1:
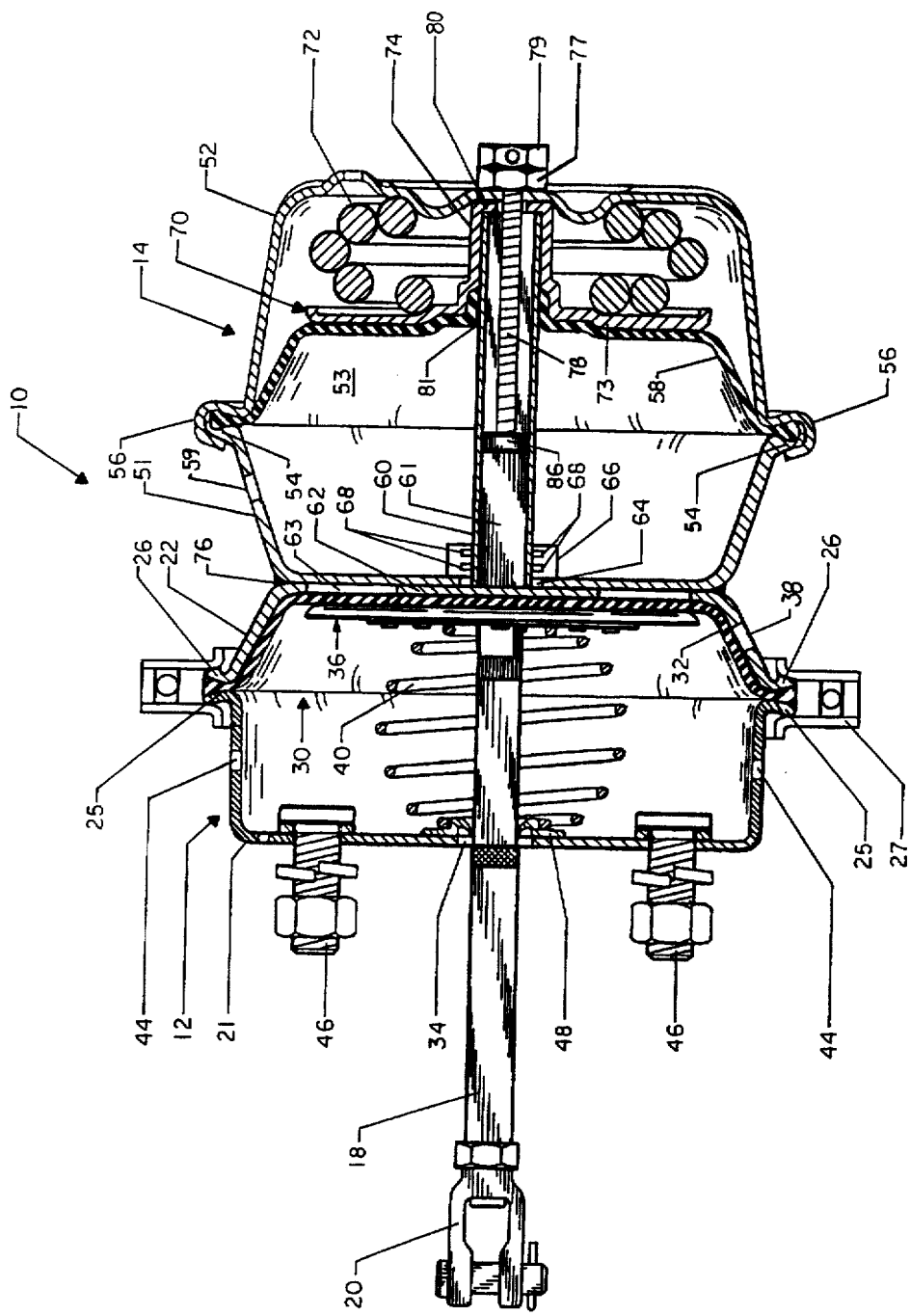
FIG. 1 is a cross sectional view of an air-operated brake actuating assembly having a two-ply pressure plate according to the invention.

Referring to the drawings and to FIG. 1, in particular, a cross sectional view of an air-operated brake actuating unit 10 having a general configuration well known in the art is shown. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connected to a conventional brake (not shown) in a standard fashion. Reciprocating motion of the push rod 18 by the actuating unit 10 will cause the brake to be alternately applied and released.

The service brake portion 12 comprises a pair of facing cup-shaped housing sections 21, 22, each having an outwardly directed flanged edge 25, 26, respectively. The housing sections 21, 22 are clamped together at their flanged edges by a clamp 27 to form a service brake inner chamber 30. The peripheral edge of an elastomeric diaphragm 32 is captured between the opposed edges 25, 26, of the housing 21, 22 and suspended within the inner chamber 30. The service brake push rod 18 extends through a central aperture 34 in housing section 21 into the service brake chamber 30 where it terminates at a two-ply pressure plate 36. A compression spring 40 extends between the two-ply pressure plate 36 and the interior surface of the housing section 21. A spring seat 48 is disposed around the central opening 34 to receive the end of the compression spring 40 and retain it in position around the opening 34. The spring 40 urges the pressure plate 36 and the service brake push rod 18 to a fully retracted position as seen in FIG. 1. Mounting studs 46 are provided to the housing section 21 to mount the brake actuating unit 10 onto an appropriate bracket (not shown).

To operate the service brake, compressed air is introduced through an air service port 38 formed in the housing section 22 to force the diaphragm 32 and the two-ply pressure plate 36 against the force of the compression of the spring 40 to actuate the push rod 18. Evacuation openings 44 are provided in the housing section 21 to allow for the rapid evacuation of air from the inner chamber 30 as the pressurized air is introduced through the air service port 38.

The spring brake 14 comprises a pair of facing cup-shaped housing sections 51, 52 joined at their edges to define an inner chamber 53. Housing section 51 is provided with an outwardly directed circumferential flanged edge 54 which is received inside of a rolled peripheral edge 56 formed on the housing section 52. An elastomeric diaphragm 58 is suspended within the spring brake chamber 53 and is captured at its peripheral edge between the edges 54, 56 of the opposed housing sections 51, 52. The portion of the chamber 53 between the diaphragm 58 and the housing section 51 forms an air chamber which is filled with compressed air supplied through an air service port 59 in the housing section 51 when the emergency brake is in its normal, released position. An actuator rod 60, aligned with push rod 18, has one end extending through a central aperture 64 formed in the end wall of the housing section 51. This end of the actuator rod 60 terminates in a reaction plate 62 which is received in a central aperture 63 of the end wall of the housing section 22 of the service brake portion 12. The central aperture 64 is provided with a bearing 66 having annular recesses to accommodate a pair of O-rings 68. The bearing 66 forms a bearing surface and an air tight seal for the actuator rod 60.

The other end of the actuator rod 60 extends through a centrally disposed aperture 81 in the diaphragm 58 and terminates in a spring brake pressure plate 70 which engages the spring brake compression springs 72. The spring brake pressure plate 70 comprises a substantially flat portion 73 engaging one end of the spring 72 and a tubular portion 74 extending generally axially along the axis of the spring 72. The tubular portion 74 is press-fit onto an end portion of the actuator rod 60 such that the spring brake pressure plate 70 and the rod 60 form an integral unit. The spring brake pressure plate 70 may be formed of cast aluminum.

During normal operation of the brake 10, the actuator rod 60 will be in the fully withdrawn position, as seen in FIG. 1, by means of compressed air which is maintained in the portion of the chamber 53 defined by the diaphragm 58 and the housing section 51. When the compressed air is exhausted, the compression spring 72, one end of which engages the outer end wall of the housing 52, forces the spring brake pressure plate 70 and integrally attached rod 60 in the direction of the brake push rod 18 of the service brake 12. The housing section 22 of the service brake 12 and housing section 51 of the spring brake 14 are preferably steel shells attached to each other by means of a circumferentially extending weld bead 76 or other suitable attachment means or can be an integral aluminum casting. The force of the spring 72 causes the actuator rod 60 to be extended through the central opening 64 and causes the reaction plate 62 to apply a force to the diaphragm 32 and two-ply pressure plate 36 of the service brake. This action causes the service brake push rod 18 to be actuated and the brake to be applied. When the brake is to be released, compressed air is once again introduced in the space between the housing section 51 and diaphragm 58. The force of the compressed air against the diaphragm 58 overcomes the compression force of the spring 72 and returns the pressure plate 70 and rod 60 to the position seen in FIG. 1.

The actuator rod 60 is a hollow tube or rod provided with a central bore 61 to accommodate a brake release or caging bolt 78. The bolt 78 is adapted to engage an end edge 80 of the tubular portion 74 of the spring brake pressure plate 70 to maintain the spring 72 in a compressed position whenever so desired. The bolt 78 may be used to manually release the spring brake or to insure that the compression spring 72 will remain fully compressed when maintenance functions are performed on the brake assembly. The bolt 78 is threaded and engages a fixed, threaded opening or nut 77 affixed by welding or staking to the end wall of the housing section 52. A second nut or head 79 is fixedly attached to the threaded bolt such that the bolt may be rotated in the nut 77 by a common wrench or the like.

Figure 3:
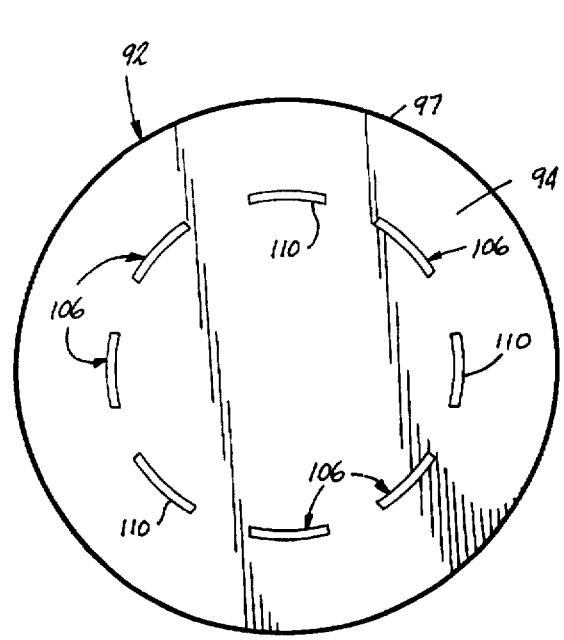
FIG. 3 is a bottom plan view of the two-ply pressure plate.
Figure 6:
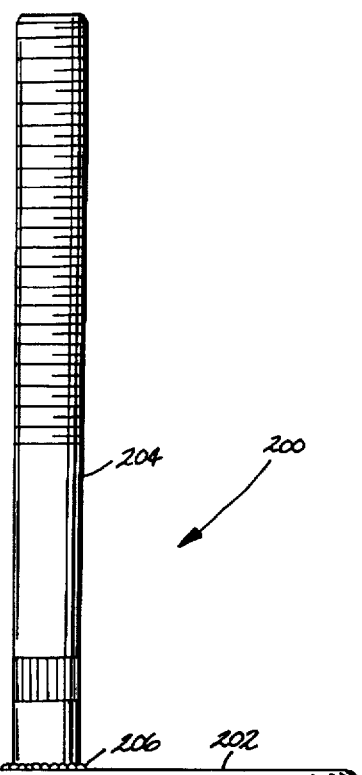
FIG. 6 is a side elevational view of a prior art pressure plate assembly.
Figure 4:
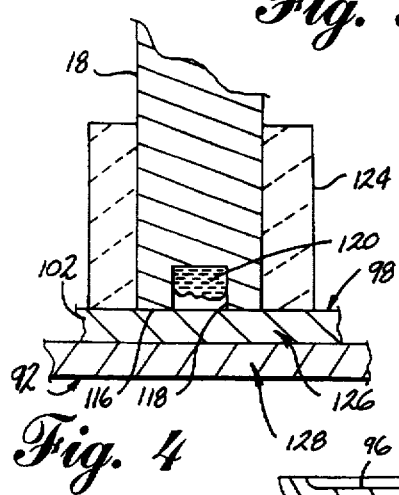
FIG. 4 is a cross sectional, detailed view of the actuator rod and pressure plates prior to welding of the rod to the pressure plate.
Figure 5:
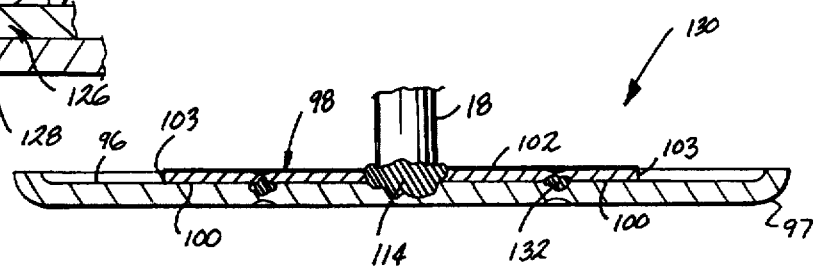
FIG. 5 is sectional view of a second embodiment of the two-ply pressure plate according to the invention.

The two-ply pressure plate 36 according to the invention provides an equally strong mounting between the push rod 18 and the plate 36 than heretofore realized while enabling reduced weight. As seen in FIGS. 3–5, a first embodiment of the pressure plate assembly 36 comprises a diaphragm plate 92, a support plate 98 mounted to the diaphragm plate 92 and the service brake push rod 18 which is mounted to both the diaphragm plate 92 and support plate 98. The diaphragm plate 92 comprises a front surface 94, a rear surface 96 and an arcuate or rolled outer peripheral edge 97. The support plate 98 comprises a front surface 100, a rear surface 102 and a peripheral edge 103. It can be seen that the support plate 98 has a diameter substantially less than the diaphragm plate 92.

Preferably, the diaphragm plate 92 and support plate 98 are mounted adjacent to one another with the front surface 100 face to face with the rear surface 96, and secured to each other at multiple locations. The two plates are interconnected through a plurality of embossments 106 which are formed in both plates intermediate the peripheral edge 103 of the support plate 98 and the rod 18. The embossments can be formed by cooperating male and female dies which deform the diaphragm plate 92 and support plate 98 such that a projection 108 extends rearwardly from the rear surface 102 of the support plate 98 and a corresponding recess 110 is formed on the front surface 94 of the diaphragm plate 92. The two plates have been deformed such that a projection 111 formed on the rear surface 96 of the diaphragm plate 92 is received in a complementary recess 112 formed on the front surface of the support plate 98. In the preferred embodiment of the pressure plate assembly 36, the embossment 106 is dimensioned such that the depth of the recess 110 and the height of the projection 108 is approximately one-half of the thickness of the diaphragm plate 92.

As seen in FIG. 3, the embossments 106 are preferably arcuate and, if connected, would define a circle concentric with the perimeter of the diaphragm plate 92. The embossments 106 serve to prevent the two plates from shifting with respect to one another by resisting shear forces acting between the two plates. In addition, the embossments 106 are spaced radially outwardly from the push rod 18 to distribute the load throughout the entire body of the support plate 98. The interconnection of the embossments 106 of the plates 92, 98 resist the shear forces caused by warping or deflecting of the outer portions of the diaphragm plate 92 relative to the support plate 98. In order for the outer portion of the diaphragm plate to shear or deflect relative to the support plate 98, the rear surface 96 of the diaphragm plate 92 would have to slide across the front surface 100 of the support plate 98. The interconnection between the front and rear surfaces resulting from the embossments 106 prevents this sliding, shear movement. Therefore, the assembly will have the strength of the two plates where it is most needed, adjacent the mounting point of the push rod 18. Preferably, the interconnections between the two plates are formed adjacent the perimeter of the smaller plate, in this case, the support plate 98. However, the relative position of the interconnections will depend largely upon the shear forces which are expected to be exerted on the pressure plate assembly. By interconnecting the two plates to one another adjacent the perimeter of the smaller plate, the maximum resistance to shear forces is achieved as a result of the greater shear area being available at the farthest interconnection point from the push rod 18.

The embossments 106 also can act as a locator on the rear surface 102 of the support plate 98 for the compression spring 40 of the service brake 12. It is important to keep the spring 40 centered around the longitudinal axis of the push rod. The embossments 106 retain the compression spring 40 in a particular orientation with respect to the push rod 18 as a result of abutting contact between the embossments 106 and the spring 40.

An alternative to the upsets described above would be an upset commercially known as the Tog-L-Lock™ which is commercially available. Similarly to the upset described above, the Tog-L-Lock™ upset results in deformation of a portion of one of the plates into the other plate, thereby mechanically interconnecting these two plates.

Figure 2:
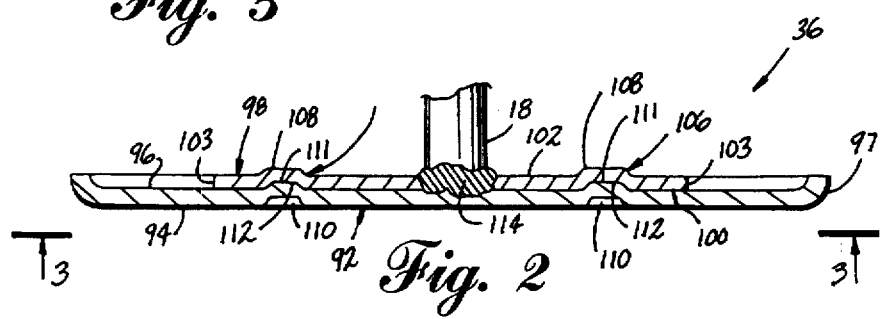
FIG. 2 is a partial sectional view of a first embodiment of the two-ply pressure plate according to the invention for use in the air-operated brake actuating assembly of FIG. 1.

The two plates 92, 98 are also connected to one another at the push rod 18. As seen in FIG. 2, the push rod 18, diaphragm plate 92 and support plate 98 are integrally welded to one another at a fusion zone 114 comprising material from each of the separate elements. The fusion zone 114 results from the integral welding, or bonding, of portions of the push rod 18, diaphragm plate 92 and support plate 98. The preferred welding method is a resistance welding operation wherein an end 116 of the push rod 18 along with portions of the support plate 98 and diaphragm plate 92 are welded to one another creating integral, metallurgical bonding between these three elements.

As seen in FIG. 4, the push rod 18, prior to welding, has a recess 118 formed in the end 116 thereof. A suitable flux material 120 is packed into the recess 118. The flux 120 is conventional in resistance welding operations. After the flux 120 has been placed into the recess 118 of the control rod 18, a ceramic collar 124 is telescopically received on the rod 18 to abut the rear surface 102 of the support plate 98 and surround the base of the rod 18 which also is placed against the rear surface 102. The support plate 98 is appropriately positioned against the diaphragm plate 92, with central portions thereof 126, 128 adjacent each other and coaxial with the push rod 18. The collar 124 acts as a mold to maintain the desired shape of the rod 18 and plates 92, 98 in the fusion zone 114. After all elements are in place, a compression force is applied between the push rod 18 and diaphragm plate 92 and support plate 98. Preferably, 150 pounds of compression force is applied. After a sufficient compressive force has been applied, a large pulse of electric current is passed through the diaphragm plate 92, support plate 98 and control rod 18. As the current passes through the elements, resistance to the current flow between the several elements manifests itself as heat. The combination of the large pulse of current, the pressure between the several elements and the abutting surfaces of the elements results in fusing portions of the diaphragm plate 92, support plate 98 and push rod 18 to one another within the fusion zone 114. After the fusion zone has been sufficiently cooled, the collar 124 is removed from the push rod 18 and the resulting product is a two-ply pressure plate according to the invention wherein the surfaces of the two plates are integrally connected to one another at points spaced from the push rod 18 and the central portions of the two plates are integrally welded to each other and to the push rod 18.

FIG. 5 shows a second embodiment of the service brake pressure plate assembly according to the invention. In this embodiment, the pressure plate assembly 130 comprises the push rod 18, support plate 98 and diaphragm plate 92 which are centrally welded to one another at a fusion zone 114, preferably by the previously described resistance welding process. However, instead of mechanically interconnecting the surfaces 96, 100 by embossments as illustrated in FIGS. 2 and 3, the surfaces 96, 100 are welded to one another by a conventional spot welding process. Preferably, a circle of staggered spot welds 132 surrounding the rod 18 secures the perimeter of the two plates to one another. The spot welds 132 resist the sliding, shear forces exerted on the two plates. For all embodiments, it will be appreciated that each ply of the pressure plate can be formed of 10 gauge steel which results in significant weight reduction from prior art pressure plates.

The two-ply pressure plate assembly according to the invention provides significant advantages over the conventional plate assemblies. First, the dual plate assembly provides the structural strength necessary adjacent the push rod of the assembly while also eliminating material adjacent the perimeter of the plate which is not structurally required. Therefore, the overall weight of the pressure plate assembly is reduced without sacrificing any of the structural requirements.

Prior testing has shown that the force output curve of a brake can be improved by forming a lip or flange about the perimeter of the pressure plate which bears against the diaphragm. The pressure plate assembly according to the invention can be formed from two thinner pieces of steel which replace one thick piece of steel. A flange or lip can more easily and inexpensively be formed on the outer perimeter of a thin piece of steel than on a thick piece of steel. For example, it is extremely difficult and costly to attempt to form a flange on a piece of ¼-inch steel. However, the same flange can be easily rolled into a 10-gage steel plate. Therefore, an improved force output curve can be achieved for a brake including a two-ply pressure plate according to the invention through a less expensive and easier manufacturing process than was previously known in the prior art.

Reasonable variation and modification are possible within the spirit of the foregoing specification and drawings without departing from the scope of the invention.

The embodiments for which an exclusive property or privilege is claimed are defined as follows:

1. In a brake actuating mechanism comprising a housing having first and second end walls defining a housing interior with an opening centrally disposed in the second end wall, an elastomeric diaphragm suspended within the housing and dividing the housing into a first chamber and a second chamber; a pressure plate assembly disposed in the second chamber adjacent to the diaphragm, the pressure plate assembly comprising a push rod extending out of the housing through the centrally disposed opening and adapted to connect to a brake, the pressure plate assembly being reciprocally moveable, responsive in part to the introduction and exhaust of pressurized fluid to the first chamber, the improvement in the pressure plate assembly comprising:
   a first rigid plate member having a peripheral edge, a central portion and a diameter;
   a second rigid plate member having a peripheral edge, a central portion and a diameter less than the diameter of the first plate member, the second plate member abutting the first plate member in face-to-face relationship with adjoining central portions and the push rod extending normally from the first and second plate members, the push rod having a proximal end thereof adjacent the central portions wherein the proximal end and the central portions of the first and second plate members are integrally welded to bond them to each other
   whereby the pressure plate assembly will be thicker at the center thereof and thinner at the periphery thereof so as to maintain its structural integrity under force while carrying less weight.

2. A brake actuating mechanism according to claim 1 wherein the first and second plate members are further secured to each other by an interconnection located intermediate the central portions and the peripheral edges.

3. A brake actuating mechanism according to claim 2 wherein the interconnection comprises at least one spot weld between the first and second plate members.

4. A brake actuating mechanism according to claim 2 further comprising a plurality of interconnections between the first and second plate members.

5. A brake actuating mechanism according to claim 4 wherein the interconnections are spaced intermittently about the central portions of the first and second plate members in a circular pattern.

6. A brake actuating mechanism according to claim 5 wherein the interconnections are adjacent the peripheral edge of the second plate member.

7. A brake actuating mechanism according to claim 1 wherein the first plate member is circular and has a first diameter and the second plate member is circular and has a second diameter and the push rod is circular in cross section and has a third diameter, the first diameter being greater than the second diameter which is, in turn, greater than the third diameter.

8. A brake actuating mechanism according to claim 2 wherein the interconnection comprises at least one embossment formed in the first and second plate members to deform the members such that they are mechanically connected to one another.

9. A brake actuating mechanism according to claim 8 wherein the at least one embossment is arcuate along a plane parallel to the plane of the second plate member.

10. A brake actuating mechanism according to claim 9 and further comprising multiple embossments staggered intermittently about the central portions of the first and second plate members in a circular pattern.

11. A brake actuating mechanism according to claim 1 wherein the first plate member has a lip at its peripheral edge extending away from the diaphragm.

12. In a brake actuating mechanism comprising a housing having first and second end walls defining a housing interior with an opening centrally disposed in the second end wall, an elastomeric diaphragm suspended within the housing and dividing the housing into a first chamber and a second chamber; a pressure plate assembly disposed in the second chamber adjacent to the diaphragm, the pressure plate assembly comprising a push rod extending out of the housing through the centrally disposed opening and adapted to connect to a brake, the pressure plate assembly being reciprocally moveable, responsive in part to the introduction and exhaust of pressurized fluid to the first chamber, the improvement in the pressure plate assembly comprising:
   a first rigid plate member having a peripheral edge, a central portion and a diameter; and
   a second rigid plate member having a peripheral edge, a central portion and a diameter less than the diameter of the first plate member, the second plate member being located between the first plate member and the push rod, the push rod being mounted directly to the central portion of the first plate member and extending normally therefrom wherein the first and second plate members are secured to each other by at least one interconnection located intermediate the central portions and the peripheral edges to resist shear forces acting between the first and second plate members
   whereby the pressure plate assembly will be thicker at the center thereof and thinner at the periphery thereof so as to maintain its structural integrity under force while carrying less weight.

13. A brake actuating mechanism according to claim 12 wherein the at least one interconnection comprises a spot weld between the first and second plate members.

14. A brake actuating mechanism according to claim 12 wherein the at least one interconnection comprises a plurality of spot welds between the first and second plates.

15. A brake actuating mechanism according to claim 14 wherein the spot welds are spaced intermittently about the central portions of the first and second plate members in a circular pattern.

16. A brake actuating mechanism according to claim 15 wherein the spot welds are adjacent the peripheral edge of the second plate member.

17. A brake actuating mechanism according to claim 12 wherein the interconnection comprises at least one embossment formed in the first and second plate members to deform the members such that they are mechanically connected to one another.

18. A brake actuating mechanism according to claim 17 wherein the at least one embossment is arcuate along a plane parallel to the plane of the second plate member.

19. A brake actuating mechanism according to claim 17 and further comprising multiple embossments staggered intermittently about the central portions of the first and second plate members in a circular pattern.

20. A brake actuating mechanism according to claim 12 wherein the first plate member has a lip at its peripheral edge extending away from the diaphragm.

* * * * *